(12) United States Patent
Duan et al.

(10) Patent No.: US 7,240,820 B2
(45) Date of Patent: Jul. 10, 2007

(54) CLAMPING DEVICE FOR PROCESSING ELECTRONIC DEVICES

(75) Inventors: Rong Duan, Singapore (SG); Wei Hong He, Singapore (SG); Ka Shing Kwan, Singapore (SG)

(73) Assignee: ASM Technology Singapore Pte Ltd., Singapore (SG)

( * ) Notice: Subject to any disclaimer, the term of this patent is extended or adjusted under 35 U.S.C. 154(b) by 408 days.

(21) Appl. No.: 10/894,514

(22) Filed: Jul. 19, 2004

(65) Prior Publication Data

US 2006/0011701 A1    Jan. 19, 2006

(51) Int. Cl.
*B23K 37/00* (2006.01)
(52) U.S. Cl. .......................... 228/44.7; 228/4.5
(58) Field of Classification Search ................. 228/4.5, 228/44.7
See application file for complete search history.

(56) References Cited

U.S. PATENT DOCUMENTS

| | | | | |
|---|---|---|---|---|
| 3,376,635 A | * | 4/1968 | Moesker | 228/180.5 |
| 5,035,034 A | * | 7/1991 | Cotney | 29/25.01 |
| 5,242,103 A | * | 9/1993 | Denvir | 228/179.1 |
| 5,611,478 A | * | 3/1997 | Asanasavest | 228/110.1 |
| 5,954,842 A | * | 9/1999 | Fogal et al. | 29/25.01 |
| 6,062,459 A | * | 5/2000 | Sabyeying | 228/4.5 |
| 6,390,350 B2 | * | 5/2002 | Fogal et al. | 228/4.5 |
| 6,921,017 B2 | * | 7/2005 | Evers et al. | 228/212 |
| 2001/0007084 A1 | * | 7/2001 | Koo et al. | 700/117 |

* cited by examiner

*Primary Examiner*—Jonathan Johnson
(74) *Attorney, Agent, or Firm*—Ostrolenk, Faber, Gerb & Soffen, LLP

(57) ABSTRACT

A clamping device is provided for holding an electronic device, such as a semiconductor carrier in the form of a leadframe, during processing thereof. It includes a main body for covering the electronic device and an opening in the main body for providing access to a part of the electronic device to be worked upon. A support structure is attachable for coupling it to a periphery of the opening whereby the support structure is extended across the opening for supporting the part of the electronic device that is accessible through the opening.

16 Claims, 2 Drawing Sheets

CLAMPING DEVICE FOR PROCESSING ELECTRONIC DEVICES

FIELD OF THE INVENTION

The invention relates to a clamping device for holding electronic devices firmly during processing, including without limitation, during the bonding of wire connections on electronic devices, such as semiconductor dice or IC chips, leadframes or other substrates.

BACKGROUND AND PRIOR ART

During semiconductor processing, it is necessary in the case of certain types of devices to attach a semiconductor die or IC chip onto a carrier such as a leadframe or other substrate. Wire connections must then be made between conductive pads on the die and the carrier respectively so that the die and the carrier are electrically connected. Commonly, an ultrasonic transducer including a capillary attached to the transducer is used to feed bonding wire through the tip of the capillary, such that ultrasonic energy can be transmitted to the tip of the capillary to initiate bonding or welding of the wire to the conductive pad.

During this process of ultrasonic bonding, the carrier must be held securely by a clamping device for high-precision wire-bonding. As the device gets smaller, the challenge of holding each component on the device more securely is increased. Generally, the clamping device should cover and exert pressure on most of the surface area of the carrier since the carrier is usually made of a flexible material that would tend to shift upon the application of forces during a bonding process. The clamping device includes a window over a portion of the carrier that is to be worked upon for access by the capillary of the ultrasonic transducer. Thus the clamping device is often referred to as a window clamp.

It is preferred that the size of the window corresponds as closely as possible to the size of a bonding unit comprising a die and surrounding conductive pads on the carrier so that the maximum area of the carrier is clamped without blocking access to the bonding unit by the capillary and the bonding unit can be held and supported more securely during wire-bonding. In the case of larger dice or if vacuum suction is applicable to assist in holding down the carrier, it is adequate to have a single relatively large window.

However, when the size of the die gets smaller or vacuum suction is not applicable, it is generally not desirable to have an array of bonding units exposed in the window because bonding units or portions thereof that are located away from the edges of the window cannot be clamped securely. Accordingly, the size of the window needs to be correspondingly reduced. Otherwise, the unclamped dice cannot be wire-bonded reliably. On the other hand, to design and manufacture a small window to fit just one small bonding unit would lead to inefficiency and increased cycle time because the window of the clamping device would need to be indexed afresh for each and every bonding unit in order to make wire connections.

One way to overcome this inefficiency is to fabricate a window that comprises many smaller openings divided by support structures so as to increase support for bonding units that are located away from the edge of the window. FIG. 1 is a plan view of a prior art clamping device 100 with multiple elongated slots 108 for access to a electronic device to be processed. The prior art clamping device 100 has a main body 104 and a window 106 located substantially centrally on the main body 104. Each elongated slot 108 corresponds to a position of a row of bonding units, and is separated from an adjacent elongated slot 108 by a rib 110. In this way, the ribs 110 support the bonding units located away from the edges of the window 106, and an array of bonding units may be bonded without having to repeatedly index the bonding units with respect to the clamping device 100.

Unfortunately, in modern high-density devices, the pitches between adjacent bonding units can be very small, such as 1 mm to 2 mm. Moreover, they may not allow for generation of a holding force by vacuum suction. Due to this spacing limitation, it is a formidable challenge to design a clamping device that would support multiple bonding units without adversely affecting the bonding process.

One approach would be to machine ribs 110 with smaller widths in order to match the pitches between adjacent bonding units. There would be various difficulties associated with such an approach. One problem is that there is usually a machining limitation in CNC (Computer Numerical Control) machines with respect to the length-to-width ratio of the ribs. For high-density devices with smaller pitches and a relatively large bonding area, ribs of a certain length have to be made slimmer. Machining is not practicable because as the ribs get slimmer, it is very difficult for them to maintain their linearity, or they may be easily broken because of their lack of rigidity. These factors have an impact on the feasibility and costs of manufacturing such a window clamp, as well as clamping reliability.

Another possible alternative to having to machine multiple elongated slots is to provide a clamping device with a window in the form of a single elongated slot that exposes a row or column of bonding units in the array. FIG. 2 is a plan view of a prior art clamping device 102 with a window 106 comprising a single elongated slot. A width of the slot corresponds to a width of a row or column of bonding units that are to be bonded. Nevertheless, the clamping device would have to be indexed after each row or column of dice are bonded, thereby reducing the bonding speed. The pattern recognition (PR) system of the bonding machine is also unable to look forward to the next row or column to be bonded to perform advance data processing, further resulting in lower output capacity for a given time. It would be desirable to reduce the indexing frequency during bonding and increase the output capacity for a given time.

SUMMARY OF THE INVENTION

It is thus an object of the invention to seek to provide an improved clamping device with openings that allow for access to an array of bonding units of an electronic device during bonding. It is another object of the invention to seek to provide a clamping device in which the support structure included in the openings can be more effectively fabricated for clamping bonding units that have relatively smaller pitches between adjacent bonding units, so as to overcome some of the aforesaid disadvantages associated with machining the support structure.

Accordingly, the invention provides a clamping device for holding an electronic device during processing thereof, comprising: a main body for covering the electronic device; an opening in the main body for providing access to a part of the electronic device to be worked upon; and a support structure attachable for coupling to a periphery of the opening whereby to extend across the opening and support the part of the electronic device that is accessible through the opening.

It would be convenient hereinafter to describe the invention in greater detail by reference to the accompanying drawings which illustrate one embodiment of the invention. The particularity of the drawings and the related description is not to be understood as superseding the generality of the broad identification of the invention as defined by the claims.

BRIEF DESCRIPTION OF THE DRAWINGS

An example of a preferred embodiment of a clamping device in accordance with the invention will now be described with reference to the accompanying drawings, in which.

DETAILED DESCRIPTION OF THE PREFERRED EMBODIMENT

Figure 1:
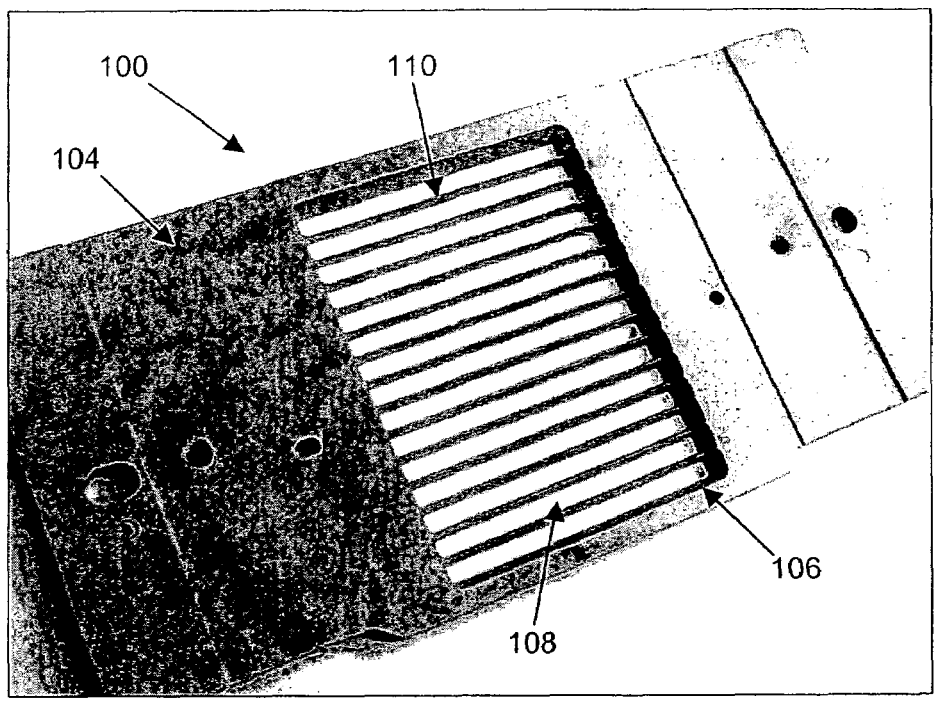
FIG. 1 is a plan view of a prior art clamping device with multiple elongated slots for access to a electronic device to be processed.
Figure 2:
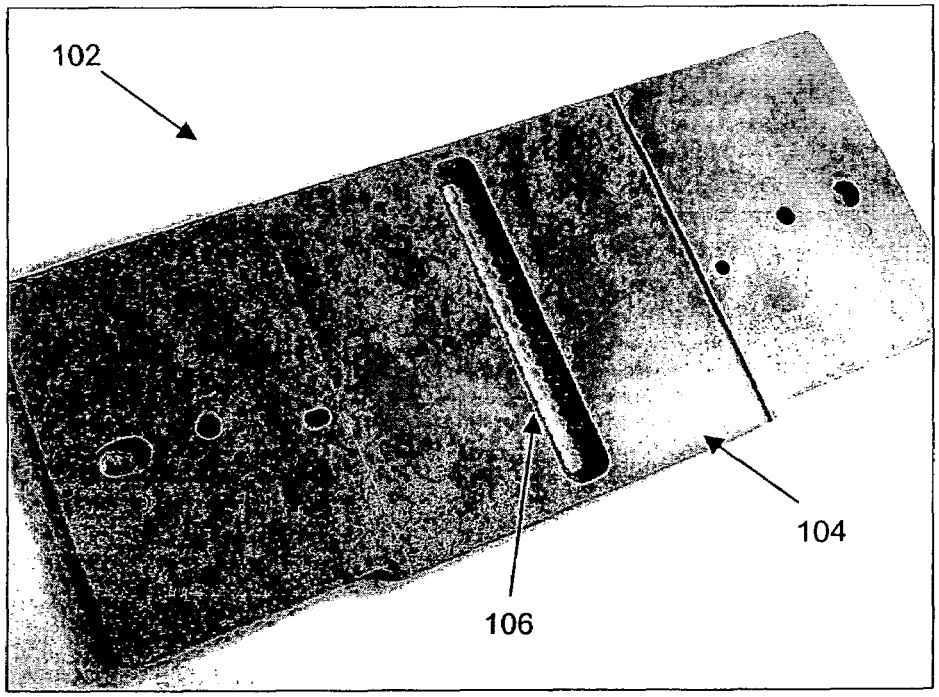
FIG. 2 is a plan view of another prior art clamping device with window comprising a single elongated slot for access to a electronic device to be processed.
Figure 3:
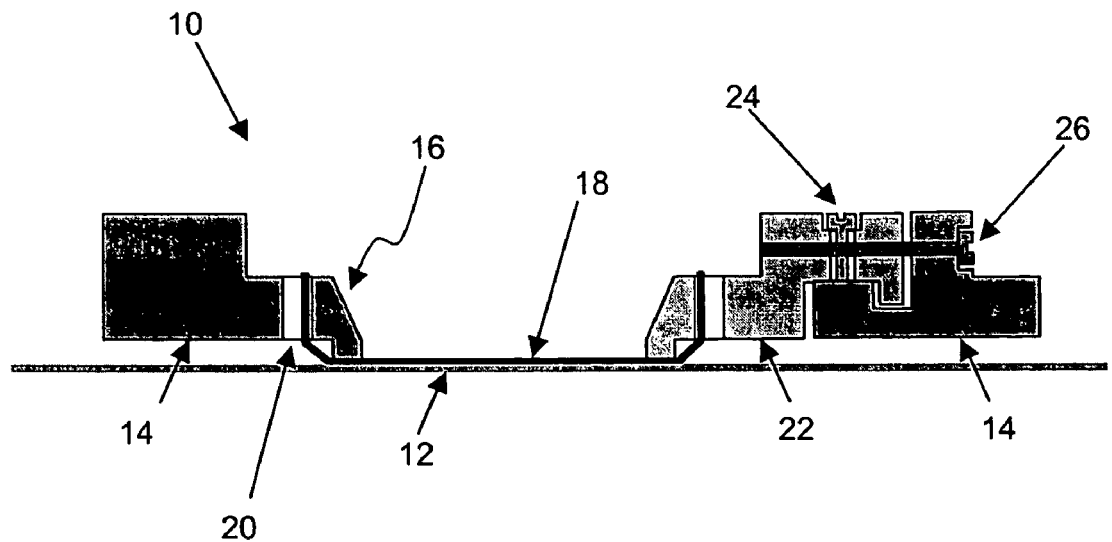
FIG. 3 is a cross-sectional side view of a clamping device according to the preferred embodiment of the invention.

FIG. 3 is a cross-sectional side view of a clamping device 10 according to the preferred embodiment of the invention. The clamping device 10 is positioned on top of an electronic device in the form of a carrier or semiconductor leadframe 12 configured for attaching semiconductor dice, in order to hold the leadframe 12 securely during wire-bonding. The clamping device 10 includes a main body 14 for covering the leadframe 12 and a window 16 defining an opening in the main body 14 for providing access to a part of the leadframe 12 that is to be worked upon. For example, where the clamping device is used in a wire bonding apparatus, the opening is adapted for access by a bonding tool of a wire-bonding machine.

In particular, the clamping device 10 includes a support structure that is attachable across the window 16 or opening for coupling to a periphery of the window 16. There is no necessity for the support structure to be attached to the periphery of the window 16 as such, but it is preferable that it is attached as close as possible to the periphery of the window 16 so that a width of the support structure is minimized. Furthermore, the support structure should be coupled to the periphery of the window 16 so that it is in contact with the same to ensure that the clamping surface of the clamping device 10 is substantially flush. The support structure is therefore configured to be in contact with the leadframe 12 to support the part of the leadframe 12 that is accessible through the opening.

In the preferred embodiment of the invention, the support structure comprises flexible material, such as a wire 18 that is attachable across the window 16. The wire 18 is affixed to the periphery of the window 16 adjacent the opening and it is preferably stretched and laid out across the window 16 over the leadframe 12. Depending on the layout of the units to be worked upon, the wire 18 may be arranged as parallel strips of material extending across the opening in the preferred embodiment. Alternatively, strips of wire 18 may be set at right angles to one another as appropriate. The wire 18 is preferably made of steel, but it should be appreciated that other materials of sufficient strength and that can withstand the relatively high bonding temperatures may be suitable.

In one implementation, the support structure comprises a single length of wire and the wire 18 is threaded through apertures or holes 20 located adjacent to the opening aligned along two sides of the window 16. The holes are configured for threading the wire 18. It is preferable that the wire 18 is tightly stretched to increase the rigidity of its support. One set of holes 20 on one side of the window 16 is preferably formed in the main body 14 whereas another set of holes on an opposite side of the window 16 is preferably formed in an adjustment assembly, that may be in the form of an extender 22. The extender 22 is configured to be movable relative to the main body 14 for adjusting the wire 18. More particularly, the extender 22 may be used to extend or stretch the wire 18.

The extender 22 overlaps part of the main body 14 and may be fixed to the main body by means of fixing screws 24 and extension screws 26. If the wire 18 is to be tightened or loosened across the window 16, the fixing screws 24 are loosened, followed by the extension screws 26 so that the extender 22 may be moved in the appropriate fixing direction. Thereafter, the extension screws 26 and fixing screws 24 may be tightened in succession in order to secure the extender 22 relative to the main body 14. In this way, the wire 18 can easily be adjusted or secured. It would be appreciated that other means of arranging and securing the position of the wire 18 relative to the main body 14 and window 16 are possible.

Figure 4:
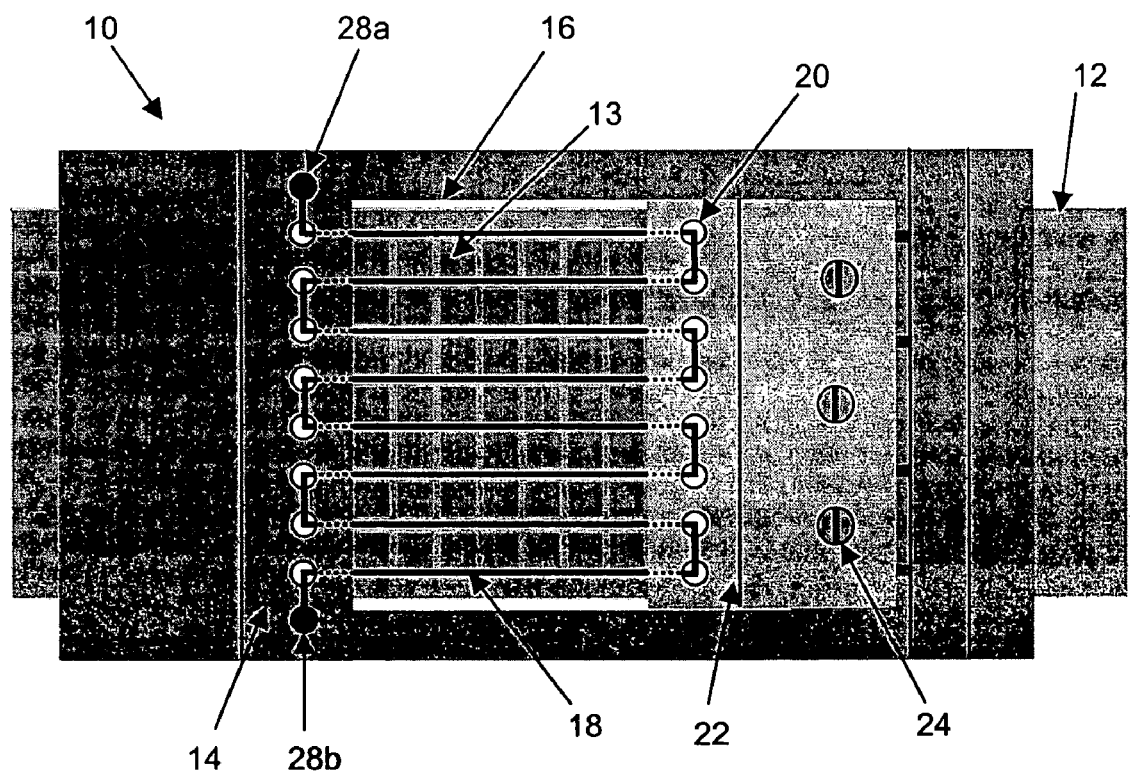
FIG. 4 is a plan view of the clamping device of FIG. 3.

FIG. 4 is a plan view of the clamping device 10 of FIG. 3. The leadframe 12 comprises multiple bonding units 13 that are to be wire-bonded and which are arranged in the form of an array. The clamping device 10 is positioned on top of the leadframe 12 to cover most of the surface area of the leadframe 12. The opening or window 16 is constructed such that a plurality of dice comprised in the bonding units 13 are accessible through the opening. The lines of wire 18 completely across the entire window 16 help to ensure that at least a portion of the wire 18 or wires of the support structure is positioned next to each of the bonding units 13 that are accessible, whereby to clamp each individual bonding unit 13 securely during wire-bonding.

Therefore, as shown in FIG. 4, the lines of the wire 18 are aligned in parallel and the position of each line is adjacent each row of bonding units 13. More specifically, it is placed along the gap running between adjacent bonding units 13. Each row of bonding units 13 is bounded by the wire 18 or the edge of the window 16 on two sides, which is sufficient for clamping such a configuration of bonding units 13. Other arrangements of the wire 18 are possible in order to adequately secure the leadframe 12, depending on the arrangement and other characteristics of the bonding units 13.

It would be noted that from the plan view of the preferred embodiment of the clamping device 10 that the holes 20 are formed equidistant to one another such that their positions correspond to positions on the leadframe 12 that are to be supported. The wire 18 is alternately stretched from holes 20 on one side of the window 16 to holes 20 on an opposite side of the window 16.

The support structure may comprise a single length of wire 18 that is affixed at one end to an anchor point 28a at one corner of the window 16, threaded through the holes 20 in the manner shown in FIG. 4 and affixed at its other end to another anchor point 28b at another corner of the window 16. However, the support structure may also comprise multiple lengths of wires that are aligned using a similar configuration. For ease of adjustment, the clamping device 10 is preferably configured such that the wire 18 may be loosened or tightened by shifting the position of the extender 22. As discussed above, the position of the extender 22 may be shifted after loosening the fixing screws 24 and extension screws 26 (see FIG. 3).

It should be appreciated that using the aforesaid flexible support structure to clamp the array of bonding units has the benefit of offering a clamping area in the opening that is much smaller in size. This is due to the smaller cross-sectional area of the support structure that can be achieved in this way as compared to machining the same out of the main body of the clamping device. Therefore, it is applicable to bonding units with smaller pitches between bonding units and to electronic devices with larger bonding areas. Furthermore, if malleable and extendible metallic wire such as steel wires are used, the wires can always be kept straight and in the right position by stretching them across the window of the clamping device.

Generally, since numerous bonding units can be clamped and visible at the same time, the indexing frequency can be much reduced. Bonding cycle time is further reduced by the ability of a pattern recognition (PR) system to look ahead to an adjacent row and/or column of bonding units to be bonded for faster data processing in an automated bonding machine.

The invention described herein is susceptible to variations, modifications and/or additions other than those specifically described and it is to be understood that the invention includes all such variations, modifications and/or additions which fall within the spirit and scope of the above description.

The invention claimed is:

1. A clamping device for holding an electronic device during processing thereof, comprising:
 a main body for covering the electronic device;
 an opening in the main body for providing access to a part of the electronic device to be worked upon; and
 a support structure of a flexible material in the form of wire attachable for coupling to a periphery of the opening and attachable completely across the entire opening whereby to extend across the opening and support the part of the electronic device that is accessible through the opening.

2. The clamping device as claimed in claim 1, wherein the flexible material comprises steel.

3. The clamping device as claimed in claim 1, wherein the support structure comprises a single length of wire.

4. The clamping device as claimed in claim 1, further including apertures located adjacent to the opening that are configured for threading the wire.

5. A clamping device for holding an electronic device during processing thereof, comprising:
 a main body for covering the electronic device;
 an opening in the main body for providing access to a part of the electronic device to be worked upon; and
 a support structure of a flexible material attachable for coupling to a periphery of the opening and attachable commmpletely across the entire opening whereby to extend across the opening and support the part of the electronic device that is accessible through the opening, the flexible material is tightened by stretching.

6. The clamping device as claimed in claim 1, further comprising an adjustment assembly adjacent to the opening for attaching the support structure.

7. The clamping device as claimed in claim 6, wherein the adjustment assembly is movable relative to the main body for adjusting the support structure.

8. The clamping device as claimed in claim 6, wherein the adjustment assembly is operative to extend the support structure.

9. The clamping device as claimed in claim 6, wherein the adjustment assembly is coupled to the main body.

10. The clamping device as claimed in claim 1, wherein the electronic device is a carrier for semiconductor dice.

11. The clamping device as claimed in claim 10, wherein the semiconductor dice are arranged in the form of an array on the carrier.

12. The clamping device as claimed in claim 11, wherein the opening is constructed such that a plurality of dice are accessible through the opening.

13. The clamping device as claimed in claim 12, wherein at least a portion of the support structure is positioned next to each die amongst the plurality of dice that are accessible when the electronic device is supported.

14. The clamping device as claimed in claim 10, wherein the opening is adapted for access by a bonding tool of a wire-bonding machine.

15. The clamping device as claimed in claim 1, wherein the support structure comprises parallel strips of material extending across the opening.

16. A wire bonding apparatus including the clamping device as claimed in claim 1.

* * * * *

UNITED STATES PATENT AND TRADEMARK OFFICE
CERTIFICATE OF CORRECTION

PATENT NO. : 7,240,820 B2
APPLICATION NO. : 10/894514
DATED : July 10, 2007
INVENTOR(S) : Rong Duan et al.

It is certified that error appears in the above-identified patent and that said Letters Patent is hereby corrected as shown below:

On Title Page
Item (75) Inventors: should read
 Rong Duan, Singapore (SG); Wei Hong He, Singapore (SG); Ka Shing Kenny Kwan, Singapore (SG).

Signed and Sealed this

Fourth Day of March, 2008

JON W. DUDAS
*Director of the United States Patent and Trademark Office*